United States Patent [19]

Brown

[11] Patent Number: 5,155,775
[45] Date of Patent: Oct. 13, 1992

[54] STRUCTURED ILLUMINATION AUTONOMOUS MACHINE VISION SYSTEM

[76] Inventor: C. David Brown, 4126 Webster Rd., Haure de Grace, Md. 21078

[21] Appl. No.: 260,423

[22] Filed: Oct. 13, 1988

[51] Int. Cl.$^5$ .............................................. G06K 9/36
[52] U.S. Cl. .................................. 382/1; 364/424.01; 382/22
[58] Field of Search ........................ 382/1, 8, 25, 22; 901/47; 244/3.15; 364/424.01, 424.02

[56] References Cited

PUBLICATIONS

Handbook of Pattern Recognition and Image Processing 1986, Tzay Young and King-Sun Fu pp. 200–201, 262–264.
Moigne et al., "Projected Light Grids for Short Range Navigation of Autonomous Robots", Computer Vision, Graphics, and Image Processing vol. 28, 1984.

Primary Examiner—Leo H. Boudreau
Assistant Examiner—David Fox
Attorney, Agent, or Firm—Paul S. Clohan; Guy M. Miller; Frank J. Dynda

[57] ABSTRACT

A method and apparatus for automatically determining pathway boundaries for autonomous robotic navigation. A structured light pattern consisting of a plurality of lines is projected on the pathway and background and the reflected pattern is detected by a stereoscopically located video camera. Since the texture of the pathway and background are different, the captured image may be processed to distinguish one from the other. Image processing includes Hough transformation of the image field, rank filtering and morphological dilation. The end points of the pathway lines identified by such processing as well as the 3-D coordinates of such end points are determined.

4 Claims, 2 Drawing Sheets

STRUCTURED ILLUMINATION AUTONOMOUS MACHINE VISION SYSTEM

The present invention is directed to a method and apparatus for automatically determining pathway boundaries for autonomic robotic navigation.

In modern day warfare, mobile robots or autonomous vehicles are deployed in a foreign terrain environment. These must be provided with a vision system which rapidly and accurately determines the location and direction of the pathway ahead, so as to keep the vehicle moving properly on the pathway.

The present invention solves the formidable problem of distinguishing between pathway and background so as to permit such automatic vehicular navigation.

The invention makes use of the fact that a major distinguishing feature between the pathway and background is the three dimensional texture of these two regions, with the texture of the pathway usually being much finer than that of the background.

In the prior art, guidance of autonomous vehicles is accomplished by sensing the difference in color between the pathway and background. However, in off road situations, many instances can be imagined when the color of the pathway differs little from that of the background. In such situations the system of the present invention can successfully discriminate between the three dimensional texture of pathway and background.

Additionally, when autonomous vehicles are navigating along predefined roadways, it is a reasonable assumption that the grade and cant of the roadway will not exceed the vehicle's capabilities. However, with off-road navigation, no such assumption can be made concerning pathways chosen by the autonomous vision system through an unstructured environment. While the color discrimination system of the prior art was not capable of providing such information, appropriate processing of the image captured with the system of the invention allows the 3-D characteristics of the pathway to be determined.

In accordance with the invention, a structured light pattern of scanned lines is projected on the area to be navigated. The reflected light pattern is viewed by a stereoscopically located video camera. The resultant image field is stored in memory, and is processed so as to determine the degree of distortion of the reflected pattern. Since the texture of the background is coarser than the texture of the pathway, scanned lines reflected from the background have a greater degree of discontinuity than those reflected from the path. Thus, appropriate processing of the image field determines the location and shape of the pathway, as well as its boundaries, and further processing determines its 3-D characteristics.

The invention will be better understood by referring to the accompanying drawings, in which.

Figure 1:
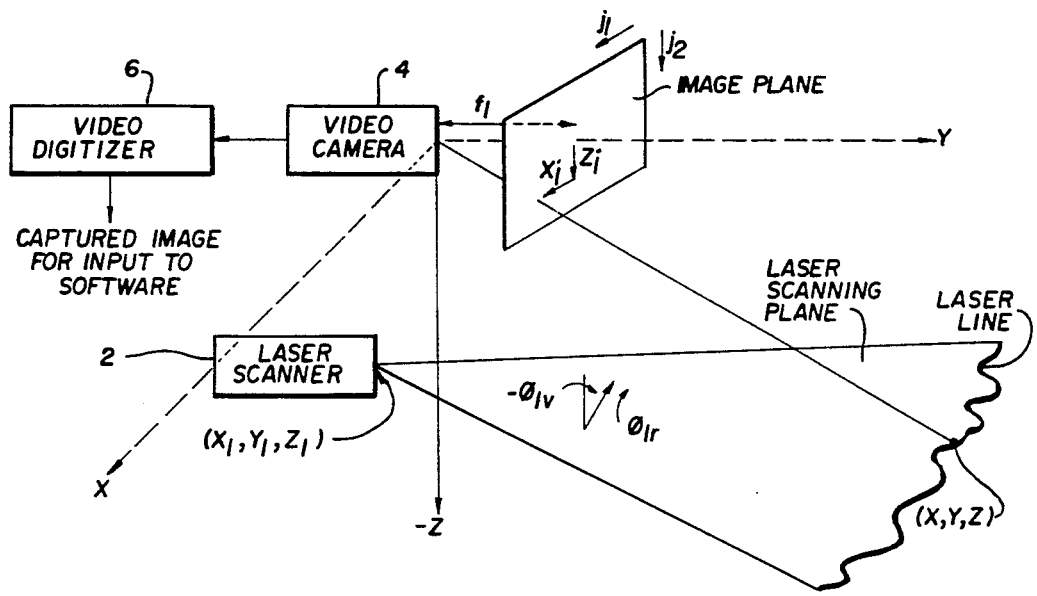
FIG. 1 is an illustration of the geometry of the system of the present invention.

Referring to FIG. 1, the geometry of the laser scanner and video camera is shown. The laser scanner 2 is arranged so as to scan horizontal lines of light on the scene to be determined.

A video camera 4 is located offset vertically and laterally from the laser scanner, so as to advantageously view the reflected light.

FIG. 1 is a geometrical model of the stereoscopic visual system utilized by the invention wherein significant features of the video camera that are incorporated into the model are the focal point, image plane, and optical axis. A 3-D, right handed, cartesian coordinate system serves as the reference frame for the camera model. The focal point is modeled by a point located at the origin of the coordinate system, and the optical axis coincides with the positive y-axis. Consequently, the image plane of the camera is parallel to the x - z plane and is displaced perpendicularly from this plane by a distance equal to the focal length (fl) of the camera lens. The image plane can reside on either the positive or negative y side of the x - z plane, but for clarity, it is placed on the positive y side.

Because the primary application for the invention entails vehicle guidance, the coordinate system shown in FIG. 1 conforms to that currently in use in vehicular environments. Although the z axis is often chosen as the axis of propagation, vehicles typically interface with a surface oriented coordinate system where the z axis extends upward, normal to the surface. Thus, the x - y plane is horizontal, with the y axis in the general direction of propagation.

FIG. 1 illustrates the association that exists between a point in an image and a particular 3-D ray. Each ray originates at the camera focal point, extends through a point in the image plane, and terminates at a point in the scene. Consequently, the video camera can be calibrated such that a pixel location in an image is sufficient for determining the angular orientation of the ray associated with a particular point.

A digitized image is a 2-D array of pixels, which is a representation of the 3-D texture in the scene. In reference to the camera model, the middle column of pixels corresponds to the y - z plane, and the middle row of pixels corresponds to the x - y plane. The intersection of these two planes, the optical axis, is mapped to the center pixel of the image. After the camera is calibrated, since the focal length of the camera lens is known, the pixel coordinates of an image point allow determination of the horizontal and vertical displacements, $x_i$ and $z_i$ respectively in FIG. 1, of the image point from the center of the image. The horizontal and vertical displacements are utilized in calculating the 3-D coordinates of the corresponding point in the scene, as explained below.

Figure 2:
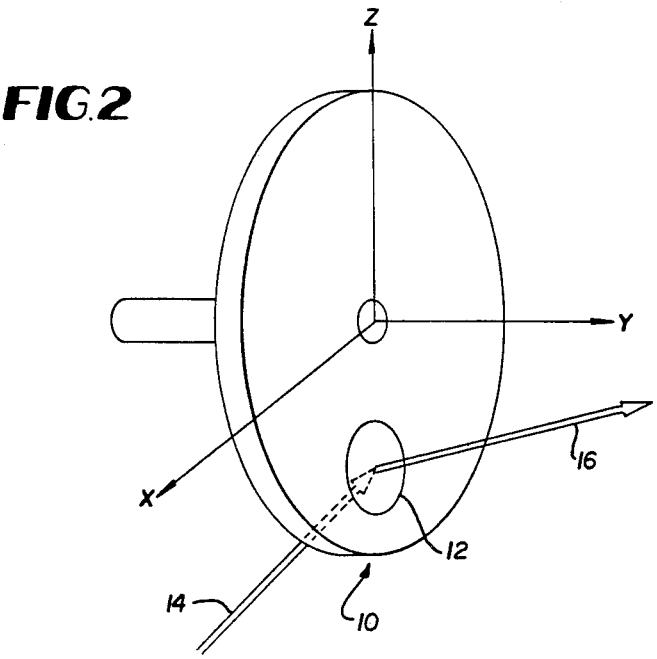
FIG. 2 is a schematic representation of a light scanner for producing the structured light pattern.

The structured light pattern is preferably produced by a holographic scanner disk such as shown in FIG. 2, spinning in the path of a laser beam. Referring to FIG. 2, disk 10 to which laser beam 14 is inputted includes holographic grating 12, and as the disk spins, sequentially scanned horizontal lines 16 are generated. Such a scanner disk is described in detail in the article entitled "Holographic Laser Beam Deflector", by R. V. Pole and H. P. Wollenmann, Applied Optics, Vol. 14, No. 4, April, 1975, as well as in U.S. Pat. No. 4,235,504, both of which are incorporated herein by reference. In the alternative, the structured horizontal lines can be obtained by a known system utilizing scanning mirrors.

The scanner disk offers an additional capability. When the gratings rotate to a position 90 degrees around the disk, they are oriented to produce vertical scanning. Therefore, if a second laser beam is incident on the disk, 90 degrees from the first beam, a grid of sequentially scanned horizontal and vertical lines is produced.

While any light source can be used to produce the structured light, laser illumination is preferred because it has sufficient power density to be sensed by a low light video camera, and sufficient collimation, when scanned across a scene, to produce fine line, easily thresholded, images suitable for further processing. Further, since laser illumination is an active source, the system is ideally suited to operation at night. Additionally, the narrow bandwidth monochromatic, high power density, nature of laser light coupled with the ability to choose a wavelength to which vegetation is highly reflective, to which a video sensor is very sensitive, and at which solar radiation is substantially reduced, make daylight operation possible using narrowband optical filters on the video sensor.

Any standard video camera will suffice, but it should be chosen such that the sensor response is high at the laser wavelength used and exhibits low image lag, low geometric distortion, and desirable ruggedness. To facilitate processing, single scan lines, or portions of these lines, can be captured by use of the electronically gated features of many a cameras, synchronized with the scanner disk. For example, a suitable camera is the Model ISG-01 Gated Intensified Solid-State (CID) Video Camera manufactured by XYBION Electronic Systems Corp.

The 3-D texture of the pathway differs greatly from that of the background in the scene, with the pathway texture being considerably more fine and regular. Therefore, the shape of the grid lines varies significantly between the pathway regions and background regions of the image, as the amount of discontinuity of the lines in various regions of the image yields an artificially generated texture which is a 2-D representation of the 3-D texture in these regions. The application of the above descriptions of image texture and the accompanying segmentation methods provides a rapid first order processing method to identify the pathway boundaries for input to a route planner for an autonomous robot or vehicle.

Referring again to FIG. 1, the image is captured with the use of real time video field digitizer 6. Image capturing consists of digitizing a single video field into a plurality of grey levels and storing it in a memory. This operation is depicted by block 40 of the overall system processing flow chart, illustrated in FIG. 5.

Figure 3:
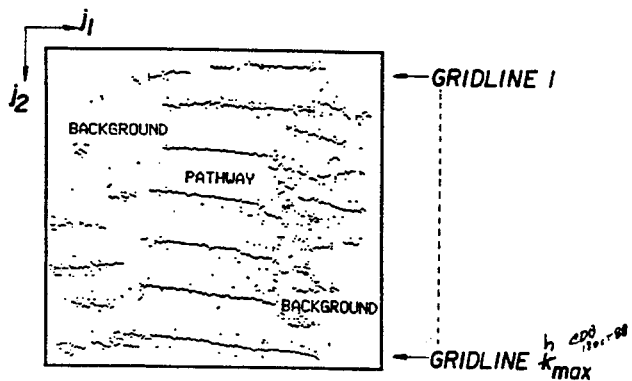
FIG. 3 is an illustration of a typical image field corresponding to a reflected light pattern.

The captured video image of structured light horizontal grid lines is depicted in FIG. 3. Because all desired information in the image is given by the fact that pixels are either illuminated by laser light or not, a binary image is desired to simplify further processing. Thus, the grey level image field is easily globally thresholded such that each pixel is reassigned a value of 0 if its grey level is less than a threshold, or 1 is greater than or equal to the threshold. The resulting binary image field facilitates further processing.

The 3-D texture in the scene is represented by the 2-D shape of the images of the laser lines. Therefore, considerable reduction in processing can be accomplished by only processing sub-fields of the image containing the image of the laser lines, and the line images are thus vertically compressed, as depicted by block 44 of the flow chart of FIG. 5.

The 3-D texture of regions in the scene is proportional to the spatial deviation of the image of the structured light grid lines. Pathway determination amounts to detection of lines in the thresholded image field. Line detection is accomplished by means of the Hough transform by mapping each image point into a parameter space based on the linear equation $j_2 = a j_1 + b$ where $j_2$ is the vertical index, $j_1$ is the horizontal index, a is the slope of the line, and b is the vertical intercept. Alternately, the transformation can be based on the normal form of the linear equation, $j_1 \cos \theta + j_2 \sin \theta = p$, where p is the normal distance from the origin to the line, and $\theta$ is the angle from the horizontal axis to the normal to the line. Acceptable pathways differ little from level, therefore, the grid line images are near horizontal, and the range of slopes of the lines is small and close to zero. Therefore, the Hough transform based on the linear equation $j_2 = a j_1 + b$ is appropriate and more computationally efficient. The Hough transformation is represented by blocks 46 and 48 of the flow chart of FIG. 5.

The Hough transform defines the image lines by providing a slope and intercept for each line. Thus, the transform maps every white image pixel into a line in the (a,b) parameter space output of the Hough transform using the equation $b_h = j_2 - a_h j_1$. The range of slopes corresponds to acceptable pathway cant, thus excluding pathways with excessive cant. The range of slopes is quantized and sequenced, forming a line in the (a,b) plane corresponding to the $(j_1, j_2)$ image spatial coordinates of each white pixel in the image field. The Hough transform output of a complete image amounts to the addition of the lines associated with each white image pixel. Peaks in the Hough transform parameter space, formed at points where many of these lines intersect, denote strong line tendencies in the image field, $t(j_1,j_2)$. Parameter space coordinates $(a_h, b_h)$ are associated with each peak denoting a line with slope $a_h$ and intercept $b_h$ in the image field.

Figure 4:
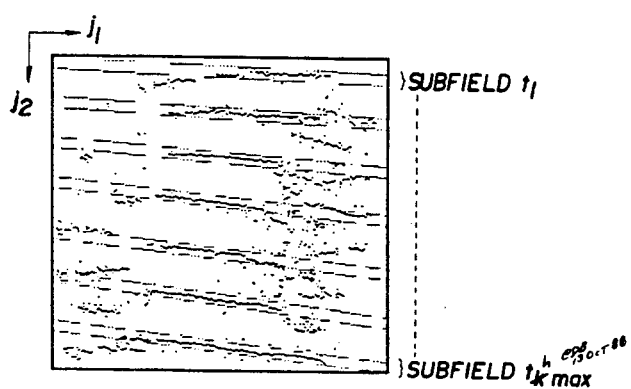
FIG. 4 is an illustration of an image field which shows division thereof into sub-fields.

As shown in FIG. 4, image subfields are extracted from the image field where the center line of each subfield, $t_h$ corresponds to the mapping: $i_1 = j_1$ and $i_2 = a_h j_1 + b_h$. Image lines of slope $a_h$ are now horizontal in the subfield, $t_h(i_1,i_2)$. Each subfield is 2p + 1 image lines high, such that each line in a subfield corresponds to the mapping:

$$i_1 = j_1 \text{ and } i_2 = a_h j_1 + b_n + l, -p \leq l \leq p. \quad (1)$$

Determining the location of a pathway requires that only regions of two textures be identified; the low texture pathway region, and high texture background. Detection of the pathway within the image subfield can now be viewed as an image filtering problem. The continuous line image across the low texture pathway region can be treated as the object of interest, whereas the broken portions of the line across the background regions appear as noise. Pathway detection amounts to filtering the noise while accurately preserving the edges of the object. A ranked order filter is chosen because it is particularly effective in a situation where the noise consists of strong impulses, such as the broken line clusters encountered in the background regions, and where the image characteristic to be preserved is object edge sharpness.

A morphological window operator is defined where M is the width of the window in pixels, and is odd, and N is the height of the window in image subfield lines. M >> N because the operator is structured to preserve horizontal lines in the subfield. The window operator is translated throughout the image subfield. The location of the window, where $i_o$ is the horizontal window center and $l_o$ is the top line, is described by:

$$W_h[t_h(i_1, i_2); i_o; l_o] = \left\{ t_h^{\,l}(i_1): i_o - \frac{M}{2} \leq i_1 \leq i_o + \frac{M}{2}; \right. \tag{2}$$

$$\left. l = l_o, l_o + N - 1 \right\}$$

A ranked order filtering operation is performed at each window location, resulting in a mapping of each image subfield, $t_h$ $(i_1, i_2)$, to a filter output subfield, $x_h$ $(i_1, i_2)$. Each pixel in the filter output subfield corresponds to the filter output:

$$x_h(i'_1, i'_2) = \text{Rank}_T[t_h(i_1, i_2) \epsilon W_h[i_o, l_o]] \tag{3}$$

where the Rank$_T$ operation consists of ordering the pixel values within the filter window and choosing the pixel value at the rank corresponding to the threshold T.

The filter output subfield is then compressed vertically into a single line, $y_h(i'_1)$, corresponding to the image field spatial location of the Hough transform extracted line, $t_h$ $(i_1)$, where:

$$y_h(i'_1) = \text{Max}[x^0{}_h(i'_1), x^1{}_h(i'_1), \ldots x^{2p-N+2}{}_h(i'_1)] \tag{4}$$

Although the ranked filter preserves the pathway edges, or ends of the pathway lines, the filtering operation erodes M/2 pixels from each end of each line and both sides of any breaks in the lines. Restoration of eroded pixels is accomplished by morphological dilation, which is a transformation which combines two sets using vector addition of set elements. If A and B are sets in Euclidean N-space ($E^N$), the dilation of A by B is denoted by $A \oplus B$ and defined by:

$$A \oplus B = [c \epsilon E^N | c = a + b \text{ for some } a \epsilon A \text{ and } b \epsilon B] \tag{5}$$

The vertical compression of the filter output subfield into a single line ($y_h$), results in the dilation needing to be performed only in the single horizontal spatial dimension, therefore, N = 1 in the above definition. Each of the resulting filtered, compressed lines is then dilated with an M by 1 structuring element, B:

$$y'_h(i'_1) = y_h(i'_1) \oplus B \tag{6}$$

The dilated line segments, $y'_h(i'_1)$, overlay the region of low texture pathway crossed by the structured light horizontal grid line, and the left and right end points, $y'_h(i_{1l})$ and $y'_h(i_{1r})$, of each line segment correspond to the left and right boundaries of the pathway in image subfield coordinates.

These end points, y40 $_h(i_{1l})$ and $y'_h(i_{1r})$, are then mapped to their corresponding image coordinates, $a_h(j_{1l}, j_{2l})$ and $a_h(j_{1r}, j_{2r})$, using the transformations:

$$j_1 = i_1 \text{ and } j_2 = a_h i_1 + b_h \tag{7}$$

The points, $a_h(j_{1l}, j_{2l})$ and $a_h(j_{1r}, j_{2r})$, constitute a pathway boundary point pair which, when combined with all other such pairs (h = 1 to $h_{MAX}$), defines the pathway location in the image field quantized corresponding to the number of horizontal structured light grid lines.

In practice, pixels are not extracted from the image field and placed in a new location and orientation. Instead, the window operator is structured with slope $a_h$ and translated through the image field, $t(j_1, j_2)$, along lines parallel to the line $j_2 = a_h j_1 + b_h$. The output of this process is a boundary point pair detected at each horizontal laser line image location. Connecting all of the left pathway boundary points with straight line segments, and all of the right points in the same manner, yields an image of the estimate of the pathway boundaries that can be overlaid on the original image for comparison purposes.

Figure 5:
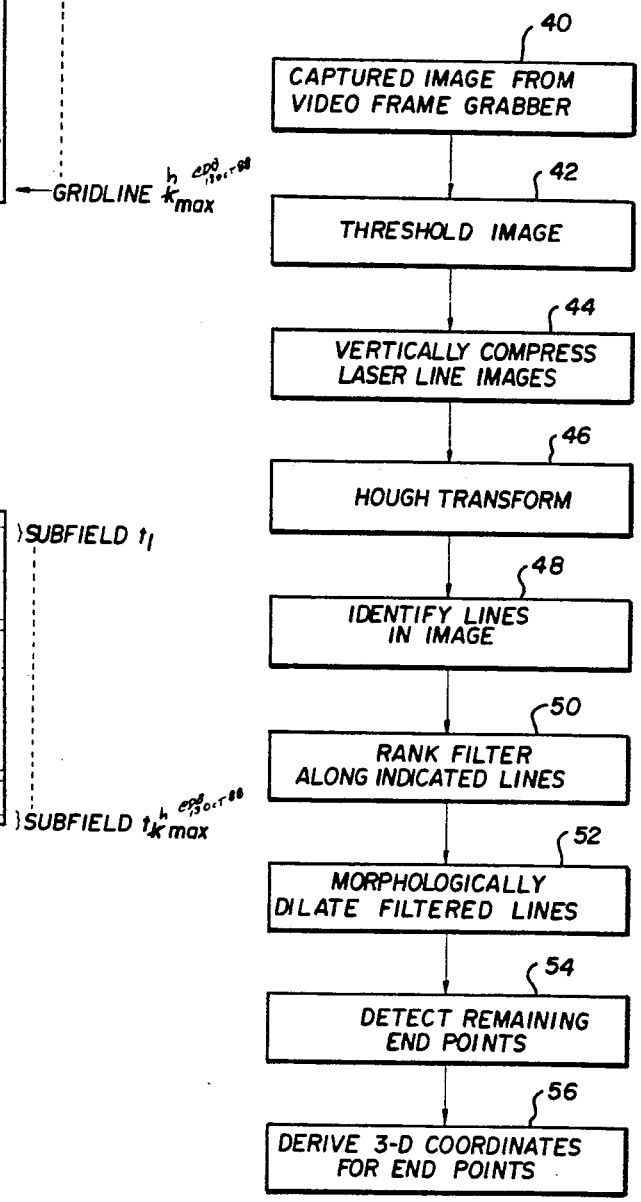
FIG. 5 is a flow chart which depicts the various image processing steps which are utilized in the present invention.

Referring to the flow chart of FIG. 5, blocks 50, 52, and 54 refer to the rank filtering, morphological dilation, and end point detecting operations respectively.

In addition to determining pathway boundaries, since adequate geometric parameters are known about the structured light projection and camera sensing system, the system of the invention is capable of determining the 3-D characteristics of the pathway.

Referring to FIG. 1, the camera focal point can be chosen as the origin, with the laser scanner focal point at $(x_l, y_l, z_l)$ The laser scan rotation angle $(\phi_{lr})$ and vertical projection angle $(\phi_{lv})$ are known, and the camera image location $(x_i, fl, z_i)$ is calculated based on the previously derived camera calibration. The coordinates $(x, y, z)$ of the laser spot in the scene can then be derived by calculating the point of intersection of the camera ray:

$$\frac{x}{x_i} = \frac{y}{fl} = \frac{z}{z_i} \tag{9}$$

with the laser scanning plane:

$$\frac{x}{x_0} + \frac{y}{y_0} + \frac{z}{z_0} = 1 \tag{10}$$

where the planar intercepts are:

$$x_0 = x_l + y_l \tan(\phi_{lv}) \sin(\phi_{lr}) + z_l \tan(\phi_{lr}) \tag{11}$$

$$y_0 = \frac{\sqrt{x_l^2 + z_l^2} \sin\left(\phi_{lr} + \tan^{-1}\left(\frac{z_l}{x_l}\right)\right)}{\tan(\phi_{lv})} + y_l$$

$$z_0 = x_l \tan(\phi_{lr}) + y_l \tan(\phi_{lv}) \cos(\phi_{lr}) + z_l$$

Solving for x, y, and z yields:

$$\begin{bmatrix} \frac{1}{x} \\ \frac{1}{y} \\ \frac{1}{z} \end{bmatrix} = \begin{bmatrix} 1 & \frac{fl}{x_i} & \frac{z_i}{x_i} \\ \frac{x_i}{fl} & 1 & \frac{z_i}{fl} \\ \frac{x_i}{z_i} & \frac{fl}{z_i} & 1 \end{bmatrix} \begin{bmatrix} \frac{1}{x_0} \\ \frac{1}{y_0} \\ \frac{1}{z_0} \end{bmatrix} \tag{12}$$

Each scan line is formed as the laser beam sweeps through a plane in space. The vertical projection angles associated with each horizontal line on the structured light grid are those corresponding to the horizontal planes swept by the laser beam as it traces the grid lines. These calculations, or a discrete calibration similar to the camera calibration need only be performed once. As long as the grid scanning remains unchanged, a look-up table method can be utilized to obtain the laser vertical projection angle corresponding to a particular grid line of interest. The camera image location is calculated based on the previously derived camera calibration and the location of the pixel in the camera image.

As a result of the above-discussed segmentation processing, the approximate vertical image location of each horizontal laser line corresponds to the vertical position of the center line, $t^o h$, of the image subfield, $t_h(i_1,i_2)$, in which it is contained. Also, the 3-D coordinates of only the points within the pathway boundaries are of interest, therefore an arbitrary number of image points can be chosen lying on the image subfield center line between the previously identified left and right boundary points, $a_h(i_{1l},i_{2l})$ and $a_h(i_{1r},i_{2r})$, in each subfield. All points in one image subfield will have the same vertical laser projection angle.

As in the segmentation procedure, the chosen subfield points are mapped to their corresponding points in the image field using the transformation shown in Eqns. 7. By using time sequential images of single laser lines, the grid line that corresponds to each chosen point is identified, such that the vertical laser projection angle of each chosen point can be determined. The image coordinates, $(j_1,j_2)$, of each chosen point can then be mapped to camera image plane coordinates using the previously described camera model and calibration. The laser angle and camera image coordinates constitute all the information required to utilize Eqn. 12 to calculate the 3-D scene coordinates corresponding to each detected point.

In practice, pixels are not extracted from the image field and placed in a new location and orientation described as a subfield. Instead, point selection is accomplished along each line $j_2 = a_h j_1 + b_h$ from the output of the Hough transform, and need only occur between the previously identified left boundary point, $b_h(j_{1l},j_{2l})$, and the and the identified right boundary point $b_h(j_{lr},j_{22})$.

Another approach to 3-D quantification is to project a grid of vertical as well as horizontal lines on the pathway and background. The points are which these lines cross within the pathway boundaries can be identified. These crossing points can be mapped to a particular horizontal and vertical laser projection angle because their sequential scanning can be synchronized to a gated video camera. Geometrical computational methods can then derive 3-D coordinates for these points. A planer fit of all such pathway points or a piecewise planer fit of points in pathway subregions could provide a vehicular navigation system with essential information such as pathway cant and grade.

An obstacle in the pathway is simply a distortion in the 3-D shape of the pathway, and is therefore sensed by all of the processing methods described. An adaptive method may be applied whereby initial processing identifies a discontinuity in pathway scan lines that may indicate the presence of an obstacle, and the laser scanner would then be aimed at that area to provide higher resolution scanning for identification.

The program listings for the Hough transform, rank filtering, morphological dilation, end-point detecting, and derivation of 3-D coordinates software are given below in the C language.

There thus has been described a method and system for automatically determining pathway boundaries and for 3-D characterization of the pathway.

While the invention has been described in accordance with illustrative embodiments, it should be understood that variations will occur to those skilled in the art, and the scope of the invention is to be limited only by the claims appended hereto and equivalents.

I claim:

1. A method of providing information for automatically determining pathway boundaries for autonomous robotic navigation, comprising the steps of:

projecting a structured light pattern of sequentially scanned thin horizontal lines on a pathway and background, viewing the resultant light pattern which is reflected from the pathway and background with a stereoscopically located video camera, storing an image field which includes bits which correspond to said resultant light pattern in a memory, and processing the image field to determine the degree of distortion of said resultant light pattern, wherein the texture of the background is courser than the texture of the pathway, and whereby said information for determining said pathway boundaries is provided as indicated by the scanned lines reflected from the background having a greater degree of discontinuity than those reflected from the pathway, wherein said processing includes taking the Hough transform of said image field to identify lines in said resultant light pattern, and wherein said processing further includes rank filtering said identified lines.

2. The method of claim 1 wherein said processing further includes morphologically dilating said filtered lines.

3. The method of claim 2 wherein said processing further includes detecting the end points of said lines following said morphological dilation.

4. The method of claim 3 wherein said processing further includes deriving the 3-D coordinates of the end points of the lines.

* * * * *